United States Patent [19]
Coutsomitros

[11] Patent Number: 5,625,484
[45] Date of Patent: Apr. 29, 1997

[54] OPTICAL MODULATOR

[75] Inventor: Constantin Coutsomitros, Ranco, Italy

[73] Assignee: European Economic Community (CEE), Luxembourg, Luxembourg

[21] Appl. No.: 433,422

[22] PCT Filed: Oct. 27, 1993

[86] PCT No.: PCT/EP93/02977

§ 371 Date: Aug. 9, 1995

§ 102(e) Date: Aug. 9, 1995

[87] PCT Pub. No.: WO94/10598

PCT Pub. Date: May 11, 1994

[30] Foreign Application Priority Data

Oct. 28, 1992 [LU] Luxembourg ............... 88184

[51] Int. Cl.$^6$ .................................................. H01S 3/00
[52] U.S. Cl. .................................. 359/244; 359/290
[58] Field of Search .......................... 359/9, 10, 15, 359/244, 290, 291, 292

[56] References Cited

U.S. PATENT DOCUMENTS 4,497,544  2/1985  Mitchell et al. .................... 350/353

FOREIGN PATENT DOCUMENTS

A691293  4/1940  Germany.
A3530167  3/1987  Germany.

*Primary Examiner*—Mark Hellner
*Attorney, Agent, or Firm*—Darby & Darby

[57] ABSTRACT

The invention relates to an optical modulator allowing to modulate a coherent light beam (2) by an optical signal (4). According to the invention, it comprises an optical cavity (3) composed of two superposed glass substrates (8, 9), each carrying an interferometric tridimensional lattice, said coherent beam (2) being susceptible to be directed on a first surface of said cavity (3), whereas said optical modulation signal (4) is directed against said first surface or the opposite surface of this cavity, the output signal of this modulator being constituted by said beam after reflection on said optical cavity (3).

4 Claims, 1 Drawing Sheet

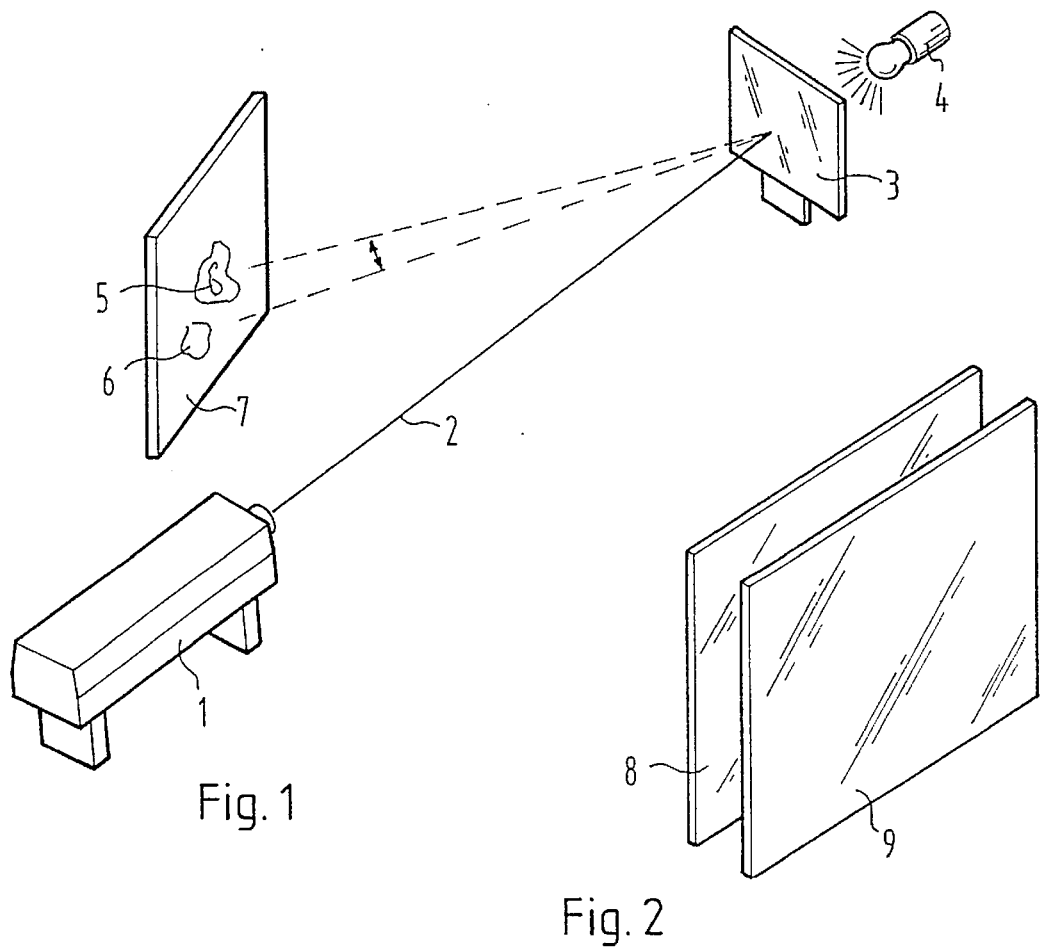
Fig. 1
Fig. 2
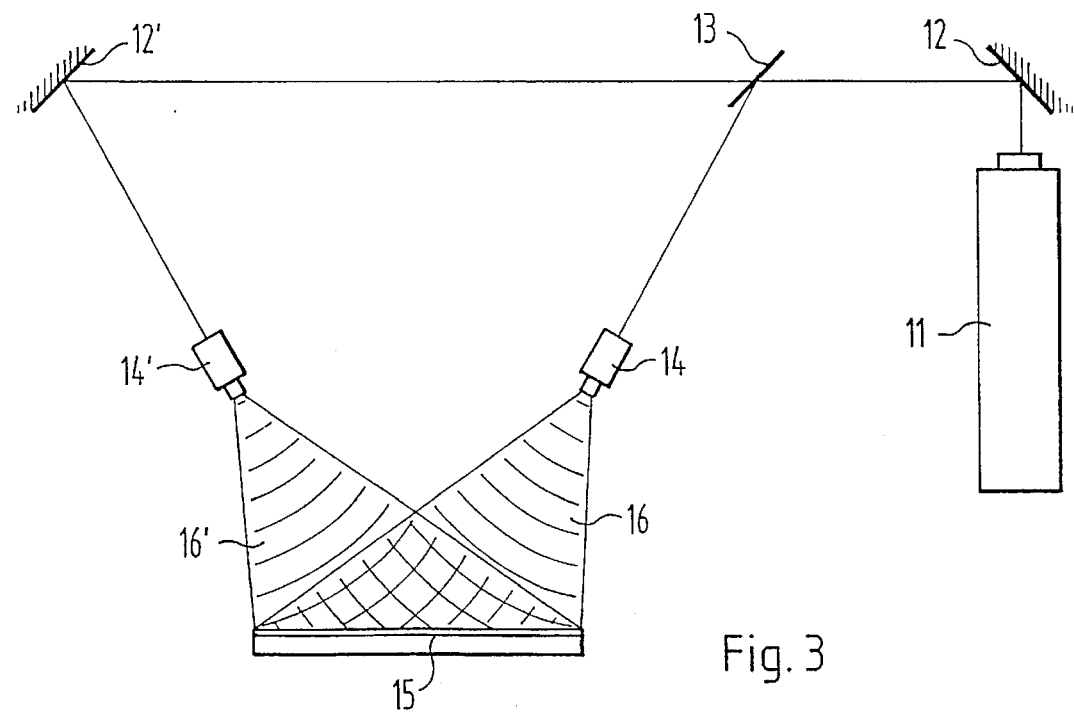
Fig. 3

OPTICAL MODULATOR

The invention refers to an optical modulator allowing to modulate a coherent light beam by an optical signal.

BACKGROUND OF THE INVENTION

It is known that an optical signal can be modulated by an electrical signal, for example a Pockels cell, or by a mechanical signal, such as a diaphragm or a pivoting mirror. Since light has an increasing importance in telecommunications and in data processing, methods are required by which an optical signal can be modulated by another optical signal. However, the results obtained by photo-refractive crystals on laboratory scale must still to be confirmed in practice.

The invention aims to propose an optical modulator, the modulating signal of which is also optical. According to the invention, this aim is achieved by an optical modulator such as defined in the main claim.

Preferred features of an embodiment of this modulator are defined in the secondary claims.

The invention will now be described more in detail by means of three figures.

BRIEF DESCRIPTION OF THE DRAWINGS

FIG. 1 shows in perspective the disposition of the elements constituting the modulator according to the invention.

FIG. 2 shows two substrates of an optical cavity used in the detector shown in FIG. 1.

FIG. 3 shows schematically how the three-dimensional interferometric lattices are recorded on the substrates of the optical cavity.

DESCRIPTION OF THE PREFERRED EMBODIMENTS

The modulator according to FIG. 1 comprises a laser generator 1 which emits a coherent light beam 2 of a very reduced transversal dimension towards an optical cavity 3. The nature of this optical cavity will be described later on in more detail by means of FIG. 2. The side of this cavity which is opposed to that which is hit by the beam 2 is susceptible to be illuminated by a modulation source 4, which might be constituted by a source of white light or a coherent light source.

As can be seen in FIG. 2, the optical cavity 2 comprises two holographic plates 8 and 9, each constituted by a glass substrate which carries on one surface a photographic emulsion, on which a three-dimensional interferometric lattice has previously been recorded, such as a so-called holographic lens. The two recordings are identical. The emulsions are, for one of the plates 8, disposed on the surface regarding the other plate 9, whereas for this plate 9, the emulsion is disposed on the side opposite to the first plate 8. The two plates have a thickness of about 1 to 4 mm and a rectangular or square outer shape, the length of one side thereof being between 10 and 40 cm. In FIG. 2, the two plates have been shown at a mutual distance, in order to show more clearly the disposition of the emulsions, but in reality, the plates are applied against one another, leaving only very little air between the two substrates. This small quantity of air defines together with the plates the real optical cavity.

FIG. 3 shows schematically how the holographic lenses are recorded on a substrate 15 carrying a photo-emulsion. A laser 11 sends a coherent beam, possibly via a mirror 12, on a beam separator 13 constituted by a semi-reflecting mirror. One of the beams is directly pointed via a spatial filter 14 onto the substrate 15, whereas the other one is reflected by a second mirror 12' towards a second spatial filter 14' in order to reach the substrate 15 according to a different angle of incidence. The spherical waves of the diverging beams 16 and 16' create in cooperation the three-dimensional lattice in the emulsion on the substrate 15 which has then to be developed and fixed. The two plates 8 and 9 of FIG. 2 are prepared in the same way and are then assembled for constituting the optical cavity 3 of FIG. 1.

When the beam 2 is sent onto the optical cavity, a micro-lattice of interference fringes is locally created on the air layer present between the two plates, these fringes being displayed by reflection of the laser light 1 of the cavity 3 on a display screen 7. By then applying a modulating signal from the source 4 onto the rear side of said cavity 3, either in the shape of coherent or of white light, the two plates start a micro-movement (by effect of the presence of radiation or the photo-thermal effect or by a mixture of both), thereby changing the thickness of the air film. This corresponds to a change in the refraction index and thus the interference strips start to move. This movement of the interference fringes is linear with respect to the applied signals. Considering independently a fringe 5 on the screen which exists in the absence of light from the source 4, this fringe deforms and moves towards the spot 6, when a certain light intensity is applied via the source 4.

Each time the intensity of the optical signal of the source 4 is stabilized, the interference fringes convert into a new constant configuration, and if the modulating source is completely eliminated, the fringes return to the initial configuration.

The sensibility of the system increases with the linear dimensions of the optical cavity. This result has been verified with rectangular supports, one side of which measures between 10 and 40 cm.

In a variant embodiment, it is possible to direct the modulation light of the source 4 on the same surface of the optical cavity 3 as the beam 2. Furthermore, the modulator according to the invention can receive simultaneously several beams such as beam 7, which are then modulated in synchronism, but with arbitrary phase relation.

In spite of the large size of this cavity, the modulator is extremely fast and permits for example to react on a pulse emitted from the source 4 having a duration of 12 nanoseconds.

In an all-optical modulator, the screen is replaced by a light reception element with small geometrical extension which receives either light reflected by the optical cavity or nothing, depending on the distribution of the fringes on the screen 7. In this case, the modulator is a binary modulator (bistable case). But it is also possible to exploit the entire range of intensities hitting the screen by varying the intensity of the source 4 continuously (multistable case).

The modulator according to the invention can be used in the field of optical computers as a binary or multistable switch and in optical telecommunications for processing a signal.

I claim:

1. An optical modulator for modulating a coherent light beam by an optical signal comprising an optical cavity composed of two superposed glass substrates each carrying a three-dimensional interferometric lattice, said coherent light beam being susceptible to be directed onto a first surface of said cavity, whereas said optical modulation signal is directed against said first surface or the opposite surface of this cavity, the output signal of this modulator being constituted by said beam after reflection on said optical cavity.

2. A modulator according to claim 1, wherein said interferometric lattices are identical and are recorded in photographic emulsions on a respective surface of each substrate such that the emulsion of one substrate is disposed on its surface facing the other substrate and the emulsion of the other substrate is on its opposite surface.

3. A modulator according to claim 1, wherein each three-dimensional interferometric lattice is constituted by a holographic lens.

4. A modulator according to claim 1, wherein the reflected beam is received on a diode or a photomultiplier.

* * * * *